(12) United States Patent
Li (10) Patent No.: US 9,525,342 B2
(45) Date of Patent: Dec. 20, 2016

(54) POWER CONVERTER WITH PSEUDO-CONSTANT-ON-TIME CONTROL AND THE CONTROL CIRCUIT AND METHOD THEREOF

(71) Applicant: Chengdu Monolithic Power Systems Co., Ltd., Chengdu (CN)

(72) Inventor: Lei Li, Chengdu (CN)

(73) Assignee: CHENGDU MONOLITHIC POWER SYSTEMS CO., LTD., Chengdu (CN)

(*) Notice: Subject to any disclaimer, the term of this patent is extended or adjusted under 35 U.S.C. 154(b) by 39 days.

(21) Appl. No.: 14/752,638

(22) Filed: Jun. 26, 2015

(65) Prior Publication Data

US 2015/0381049 A1  Dec. 31, 2015

(30) Foreign Application Priority Data

Jun. 26, 2014 (CN) .......................... 2014 1 0300831

(51) Int. Cl.
 *H02M 3/157* (2006.01)
 *H02M 3/156* (2006.01)
 *H02M 3/158* (2006.01)
 *H02M 1/00* (2006.01)

(52) U.S. Cl.
 CPC ........... *H02M 3/156* (2013.01); *H02M 3/1588* (2013.01); *H02M 2001/0025* (2013.01); *Y02B 70/1466* (2013.01)

(58) Field of Classification Search
 CPC ...... H02M 3/156; H02M 3/157; H02M 3/158; H02M 3/1588
 USPC .......................... 323/271, 283, 285, 286, 288
 See application file for complete search history.

(56) References Cited

U.S. PATENT DOCUMENTS

| | | | | |
|---|---|---|---|---|
| 8,686,703 B2* | 4/2014 | Xi | ......... | H02M 3/158 323/283 |
| 8,710,815 B2* | 4/2014 | Feng | ...... | H02M 3/156 323/271 |
| 8,717,002 B2 | 5/2014 | Xi | | |
| 8,749,216 B2 | 6/2014 | Li et al. | | |
| 8,912,938 B1* | 12/2014 | Lu | ......... | H02M 3/157 323/284 |
| 8,970,194 B2 | 3/2015 | Li | | |
| 2013/0038301 A1 | 2/2013 | Ouyang et al. | | |
| 2013/0257399 A1 | 10/2013 | Jiang et al. | | |
| 2014/0239934 A1 | 8/2014 | Zhang | | |
| 2014/0375286 A1 | 12/2014 | Jiang et al. | | |
| 2015/0042299 A1 | 2/2015 | Li | | |
| 2015/0244262 A1* | 8/2015 | Ouyang | ........ | H02M 3/158 323/283 |
| 2015/0311798 A1* | 10/2015 | Yuan | ...... | H02M 3/156 323/288 |
| 2015/0381049 A1* | 12/2015 | Li | ......... | H02M 3/156 323/288 |

* cited by examiner

*Primary Examiner* — Jeffrey Sterrett (57) ABSTRACT

A control circuit for controlling a switching circuit is disclosed. The control circuit has a ramp compensation circuit, a ramp regulating circuit and a comparison circuit. The ramp compensation circuit generates a ramp compensation signal with the amplitude proportional to the difference between 1 and the duty cycle of a main switch of the switching circuit. The ramp regulating circuit generates a ramp regulating signal with the amplitude proportional to the duty cycle of the main switch. The comparison circuit compares a reference signal with the sum of the ramp compensation signal, the ramp regulating signal and a feedback signal representative of an output voltage of the switching circuit, so as to provide a comparison result to control the switching circuit.

20 Claims, 6 Drawing Sheets

POWER CONVERTER WITH PSEUDO-CONSTANT-ON-TIME CONTROL AND THE CONTROL CIRCUIT AND METHOD THEREOF

CROSS-REFERENCE TO RELATED APPLICATION(S)

This application claims the benefit of CN application No. 201410300831.0, filed on Jun. 26, 2014, and incorporated herein by reference.

TECHNICAL FIELD

The present invention relates generally to electronic circuits, and more particularly but not exclusively to power converters and control circuits and methods thereof.

BACKGROUND

The switching frequency varies with an output voltage $V_{OUT}$ in a typical power converter with COT (constant-on-time) control. To keep the switching frequency constant regardless of variation of the output voltage $V_{OUT}$, PCOT (pseudo-constant-on-time) control is often applied in the power converters.

Figure 1:
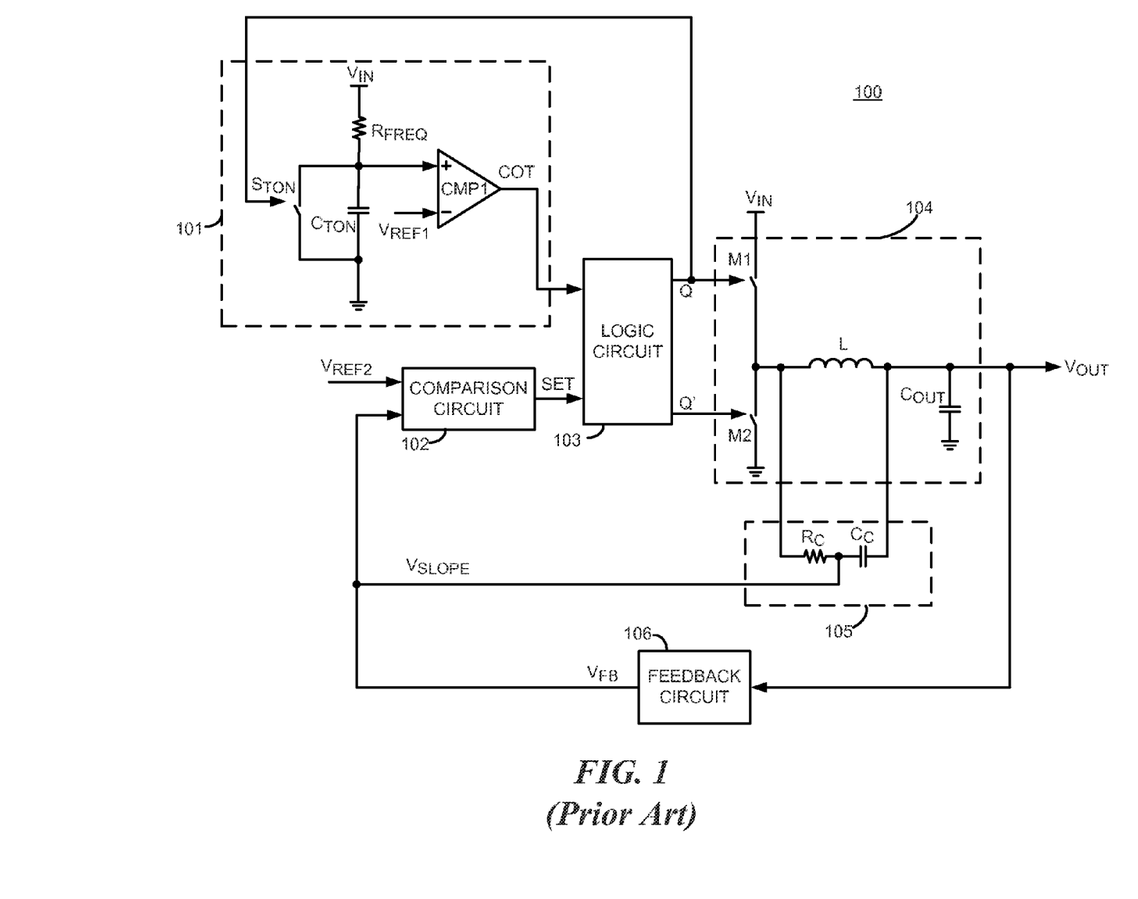
FIG. 1 illustrates a prior art PCOT power converter 100.

FIG. 1 illustrates a prior art PCOT power converter 100. The PCOT power converter 100 as illustrated comprises an on-time generating circuit 101, a comparison circuit 102, a logic circuit 103, a switching circuit 104, a ramp compensation circuit 105 and a feedback circuit 106.

In the illustrated PCOT power converter 100 of FIG. 1, the on time $T_{ON}$ of a main switch M1 of the switching circuit 104 is determined by the on-time generating circuit 101 as:

$$T_{ON} = \frac{C_{TON} \times R_{FREQ} \times V_{REF1}}{V_{IN}} \quad (1)$$

The amplitude $V_{SLOPE(PP)}$ of a ramp compensation signal $V_{SLOPE}$ generated by the ramp compensation circuit 105 is:

$$V_{SLOPE(PP)} = \frac{(V_{IN} - V_{OUT}) \times T_{ON}}{R_C \times C_C} \quad (2)$$

By substituting equation (1) into equation (2), there is:

$$V_{SLOPE(PP)} = \frac{(V_{IN} - V_{OUT}) \times C_{TON} \times R_{FREQ} \times V_{REF1}}{R_C \times C_C \times V_{IN}} = \quad (3)$$
$$\frac{C_{TON} \times R_{FREQ} \times V_{REF1} \times (1 - D)}{R_C \times C_C}$$

As can be observed from equation (3), in the PCOT power converter 100 of FIG. 1, the amplitude $V_{SLOPE(PP)}$ of the ramp compensation signal $V_{SLOPE}$ is partly determined by the duty cycle D of the PCOT power converter 100. In more detail, the larger the duty cycle D is, the smaller the amplitude $V_{SLOPE(PP)}$ is. Such small amplitude of the ramp compensation signal may easily result in an unstable system.

SUMMARY

Embodiments of the present invention are directed to a control circuit for a power converter. The power converter converts an input voltage into an output voltage. The power converter has a switching circuit. The switching circuit has a main switch, a freewheeling element and an inductor having a first terminal and a second terminal. The control circuit has an on-time generating circuit, a ramp compensation circuit, a ramp regulating circuit, a comparison circuit and a logic circuit. The on-time generating circuit generates an on-time control signal. The ramp compensation circuit generates a ramp compensation signal. The amplitude of the ramp compensation signal is proportional to 1−D with a scaling factor. D represents the duty cycle of the main switch. The ramp regulating circuit generates a ramp regulating signal. The amplitude of the ramp regulating signal is proportional to D with the scaling factor. The comparison circuit is electrically coupled to the ramp compensation circuit and the ramp regulating circuit. The comparison circuit is configured to generate a comparison signal based on a feedback signal representative of the output voltage, a reference signal and the sum of the ramp compensation signal and the ramp regulating signal. The logic circuit generates a control signal based on the on-time control signal and the comparison signal to control the main switch and the freewheeling element.

Embodiments of the present invention are also directed to a power converter for converting an input voltage into an output voltage. The power converter has a switching circuit and a control circuit. The switching circuit has a main switch, a freewheeling element and an inductor having a first terminal and a second terminal. The control circuit has an on-time generating circuit, a ramp compensation circuit, a ramp regulating circuit, a comparison circuit and a logic circuit. The on-time generating circuit generates an on-time control signal. The ramp compensation circuit generates a ramp compensation signal. The amplitude of the ramp compensation signal is proportional to 1−D with a scaling factor. D represents the duty cycle of the main switch. The ramp regulating circuit generates a ramp regulating signal. The amplitude of the ramp regulating signal is proportional to D with the scaling factor. The comparison circuit is electrically coupled to the ramp compensation circuit and the ramp regulating circuit. The comparison circuit is configured to generate a comparison signal based on a feedback signal representative of the output voltage, a reference signal and the sum of the ramp compensation signal and the ramp regulating signal. The logic circuit generates a control signal based on the on-time control signal and the comparison signal to control the main switch and the freewheeling element.

Embodiments of the present invention are further directed to a control method for a power converter. The power converter has a switching circuit. The switching circuit has a main switch and a freewheeling element. And the switching circuit is configured to provide an output voltage. The control method has the following steps: generating an on-time control signal; generating a ramp compensation signal, wherein the amplitude of the ramp compensation signal is proportional to 1−D with a scaling factor, and wherein D represents the duty cycle of the main switch; generating a ramp regulating signal, wherein the amplitude of the ramp regulating signal is proportional to D with the scaling factor; generating a comparison signal based on a feedback signal representative of the output voltage, a reference signal and the sum of the ramp compensation signal and the ramp regulating signal; and controlling the main switch and the freewheeling element on and off according to the on-time control signal and the comparison signal.

BRIEF DESCRIPTION OF THE DRAWINGS

The present invention can be further understood with reference to the following detailed description and the appended drawings, wherein like elements are provided with like reference numerals.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

Figure 2:
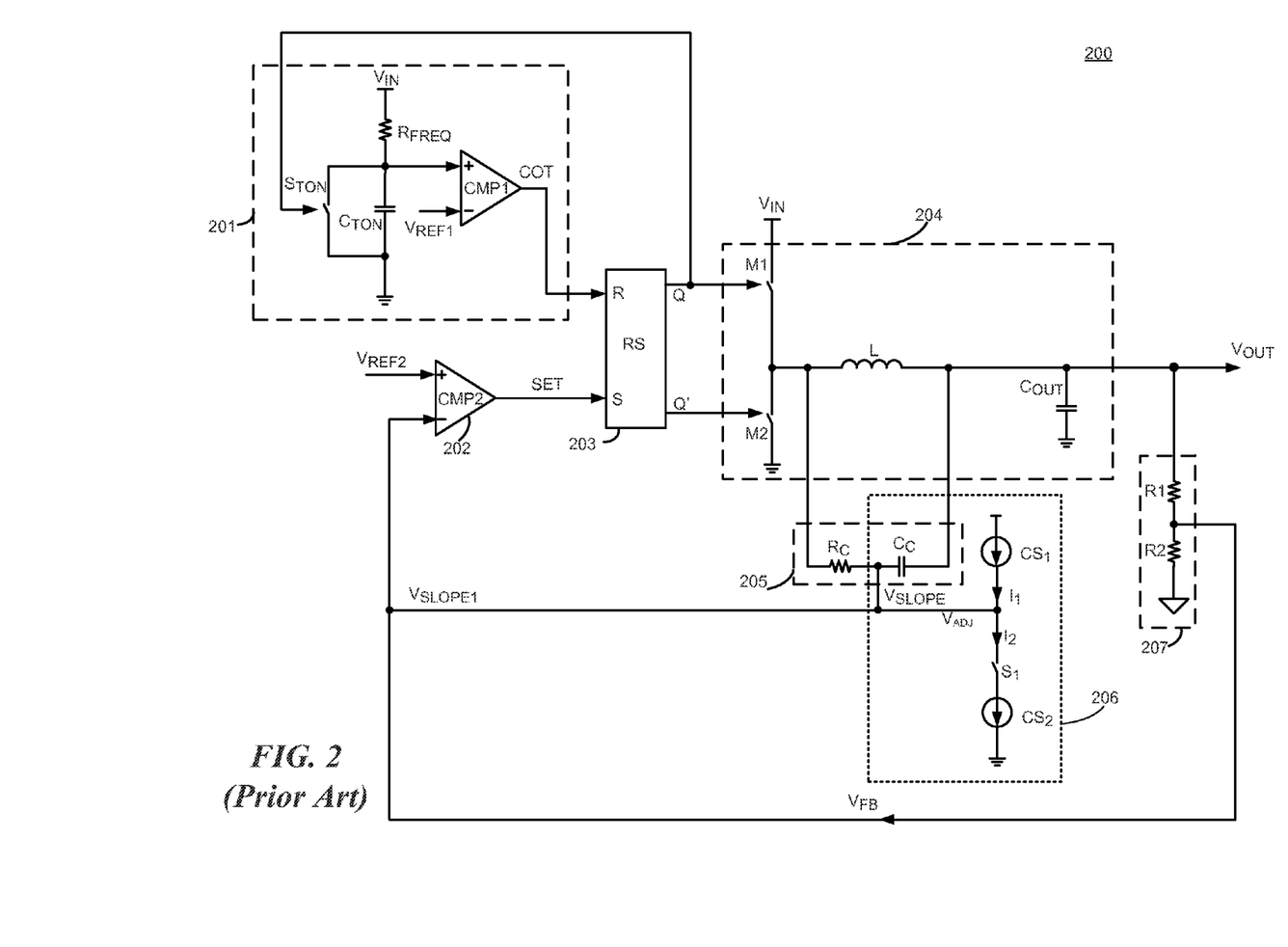
FIG. 2 illustrates a power converter 200 in accordance with an embodiment of the present invention.

FIG. 2 illustrates a power converter 200 in accordance with an embodiment of the present invention. The power converter 200 comprises a switching circuit 204, a feedback circuit 207 and a control circuit which comprises an on-time generating circuit 201, a comparison circuit 202, a logic circuit 203, a ramp compensation circuit 205 and a ramp regulating circuit 206.

The on-time generating circuit 201 is configured to generate an on-time control signal COT to control the on time of the switch/switches of the switching circuit 204. The on-time generating circuit 201 comprises a resistor $R_{FREQ}$, a capacitor $C_{TON}$, a switch $S_{TON}$ and a comparator CMP1. The resistor $R_{FREQ}$ has a first terminal and a second terminal, wherein the first terminal is configured to receive an input voltage $V_{IN}$. The capacitor $C_{TON}$ has a first terminal and a second terminal, wherein the first terminal is electrically coupled to the second terminal of the resistor $R_{FREQ}$, and the second terminal is electrically coupled to a reference ground. The switch $S_{TON}$ has a first terminal, a second terminal and a control terminal, wherein the first terminal is electrically coupled to the second terminal of the resistor $R_{FREQ}$, and the second terminal is electrically coupled to the reference ground. The comparator CMP1 has a first input terminal, a second input terminal and an output terminal, wherein the first input terminal is electrically coupled to the first terminal of the capacitor $C_{TON}$ to receive the voltage thereacross, and the second terminal is configured to receive a reference signal $V_{REF1}$. The comparator CMP1 compares the voltage across the capacitor $C_{TON}$ with the reference signal $V_{REF1}$ and generates the on-time control signal COT at the output terminal. It should be noted that the on-time generating circuit 201 of FIG. 2 is for illustrative purpose and should not be construed as limiting the scope of the present invention in any manner, of course, other embodiments are contemplated where the on-time generating circuit may take any other appropriate configuration.

As an option, the switching circuit 204 is implemented with a synchronous buck topology in FIG. 2, as illustrated. The switching circuit 204 comprises a main switch M1, a freewheeling switch M2, an inductor L and a capacitor $C_{OUT}$. The switching circuit 204 is configured to convert the input voltage $V_{IN}$ into an output voltage $V_{OUT}$ by controlling the switching actions of the main switch M1 and the freewheeling switch M2. One terminal of the main switch M1 is configured to receive the input voltage $V_{IN}$ and the other terminal is electrically coupled to one terminal of the freewheeling switch M2. The other terminal of the freewheeling switch M2 is electrically coupled to the reference ground. The inductor L has a first terminal and a second terminal, wherein the first terminal is electrically coupled to the common node of the main switch M1 and the freewheeling switch M2. The capacitor $C_{OUT}$ is electrically coupled between the second terminal of the inductor L and the reference ground. The voltage across the capacitor $C_{OUT}$ serves as the output voltage $V_{OUT}$.

In one embodiment, the main switch M1 and/or the freewheeling switch M2 may be accomplished with any controllable semiconductor switching device, such as a Metal-Oxide-Semiconductor filed effect transistor (MOSFET), an insulated gate bipolar transistor (IGBT) etc. In another embodiment, the freewheeling switch M2 may be alternatively replaced by any other type of freewheeling device, like a diode. In further another embodiment, the switching circuit 204 may be implemented with any appropriate converting topologies, such as a buck-boost converter.

The ramp compensation circuit 205 comprises a compensation resistor $R_C$ and a compensation capacitor $C_C$. In particular, the compensation resistor $R_C$ has a first terminal and a second terminal, wherein the first terminal is electrically coupled to the first terminal of the inductor L. The compensation capacitor $C_C$ has a first terminal and a second terminal, wherein the first terminal is electrically coupled to the second terminal of the compensation resistor $R_C$, and the second terminal is electrically coupled to the second terminal of the inductor L. The common node of the compensation resistor $R_C$ and the compensation capacitor $C_C$ serves as an output terminal of the ramp compensation circuit 205 to provide a ramp compensation signal $V_{SLOPE}$ having an amplitude $V_{SLOPE(PP)}$ which can be calculated by equation (3).

Persons of ordinary skill in the art will recognize that, the ramp compensation circuit 205 of FIG. 2 is for illustrative purpose and should not be construed as limiting the scope of the present invention in any manner, in another embodiment, the ramp compensation circuit may take any other appropriate configuration, just by way of example, a ramp compensation circuit accomplished with digital circuits, or a ramp compensation circuit capable of emulating the current flowing through the inductor L with a configuration of current sources and/or current sinks.

The ramp regulating circuit 206 comprises a current circuit and the compensation capacitor $C_C$ of the ramp compensation circuit 205. The current circuit is electrically coupled to the first terminal of the compensation capacitor $C_C$ to charge or discharge the compensation capacitor $C_C$, which in turn provides a ramp regulating signal $V_{ADJ}$ at the first terminal of the compensation capacitor $C_C$. When the main switch M1 is turned on, the current circuit delivers a current with an absolute value $$\frac{V_{OUT}}{R_C}$$

to the compensation capacitor $C_C$. While when the freewheeling switch M2 is turned on, the current circuit absorbs a current with an absolute value $$\frac{V_{OUT}}{R_C} \times \frac{D}{1-D}$$

from the compensation capacitor $C_C$. More specifically, as illustrated in FIG. 2, the current circuit comprises a current source CS1, a current sink CS2 and a switch S1. The current source CS1 is electrically coupled to the first terminal of the compensation capacitor $C_C$ to deliver a current I1 with an absolute value $$\frac{V_{OUT}}{R_C}$$

to the compensation capacitor $C_C$. The current sink CS2 is serially coupled to the switch S1 and the first terminal of the compensation capacitor $C_C$ and absorbs a current I2 with an absolute value $$\frac{V_{OUT}}{R_C} \times \frac{D}{1-D}$$

from the compensation capacitor $C_C$, wherein the switch S1 and the freewheeling switch M2 are turned on and off synchronously.

Thus, the amplitude $V_{ADJ(PP)}$ of the ramp regulating signal $V_{ADJ}$ can be expressed as:

$$V_{ADJ(pp)} = \frac{V_{OUT} \times T_{ON}}{R_C \times C_C} = \frac{V_{OUT} \times C_{TON} \times R_{FREQ} \times V_{REF1}}{R_C \times C_C \times V_{IN}} = \frac{C_{TON} \times R_{FREQ} \times V_{REF1} \times D}{R_C \times C_C} \quad (4)$$

Applying equations (3) and (4), the amplitude $V_{SLOPE1(PP)}$ of the sum $V_{SLOPE1}$ of the ramp compensation signal and the ramp regulating signal can be expressed as:

$$V_{SLOPE1(pp)} = V_{SLOPE(pp)} + V_{ADJ(pp)} = \frac{C_{TON} \times R_{FREQ} \times V_{REF1}}{R_C \times C_C} \quad (5)$$

As can be observed from equation (5), with a given capacitor $C_{TON}$ and resistors $R_{FREQ}$ and $R_C$, and also a given reference signal $V_{REF1}$, the amplitude $V_{SLOPE1(PP)}$ of the sum signal $V_{SLOPE1}$ is a constant value and does not vary with the duty cycle D of the power converter 200, thus resulting in a more stable system.

The feedback circuit 207 comprises a voltage divider consisting of serially-connected resistors R1 and R2. The feedback circuit 207 is electrically coupled between the output terminal of the switching circuit 204 and the reference ground and is configured to provide a feedback signal $V_{FB}$ at the common node of the resistors R1 and R2 based on the output voltage $V_{OUT}$.

The comparison circuit 202 has a first input terminal, a second input terminal and an output terminal, wherein the first input terminal is electrically coupled to the output terminals of the feedback circuit 207, the ramp compensation circuit 205 and the ramp regulating circuit 206 to receive the sum $V_{SLOPE1}$ of the feedback signal $V_{FB}$, the ramp compensation signal $V_{SLOPE}$ and the ramp regulating signal $V_{ADJ}$, and the second input terminal is configured to receive a reference signal $V_{REF2}$. The comparison circuit 202 compares the sum $V_{SLOPE1}$ with the reference signal $V_{REF2}$ and thereby generates a comparison signal SET at the output terminal.

The logic circuit 203 has a first input terminal and a second input terminal, wherein the first input terminal is electrically coupled to the on-time generating circuit 201 to receive the on-time control signal COT, and the second input terminal is electrically coupled to the comparison circuit 202 to receive the comparison signal SET. The logic circuit 203 is configured to generate controls signals Q and Q' based on the on-time control signal COT and the comparison signal SET so as to control the switching actions of the main switch M1 and the freewheeling switch M2 of the switching circuit 204 as well as the switch actions of the switch $S_{TON}$ of the on-time generating circuit 201.

The power converter 200 illustrated in FIG. 2 is so configured to operate in a Continuous-Conduction-Mode (CCM). In another embodiment where the power converter 200 operates in a Discontinuous-Conduction-Mode (DCM), the current source CS1 may be coupled to the first terminal of the compensation capacitor $C_C$ through an additional switch, wherein the additional switch is turned off when both the main switch M1 and the freewheeling switch M2 are in an off state and remains on in the left time of a switching cycle.

Figure 3A:
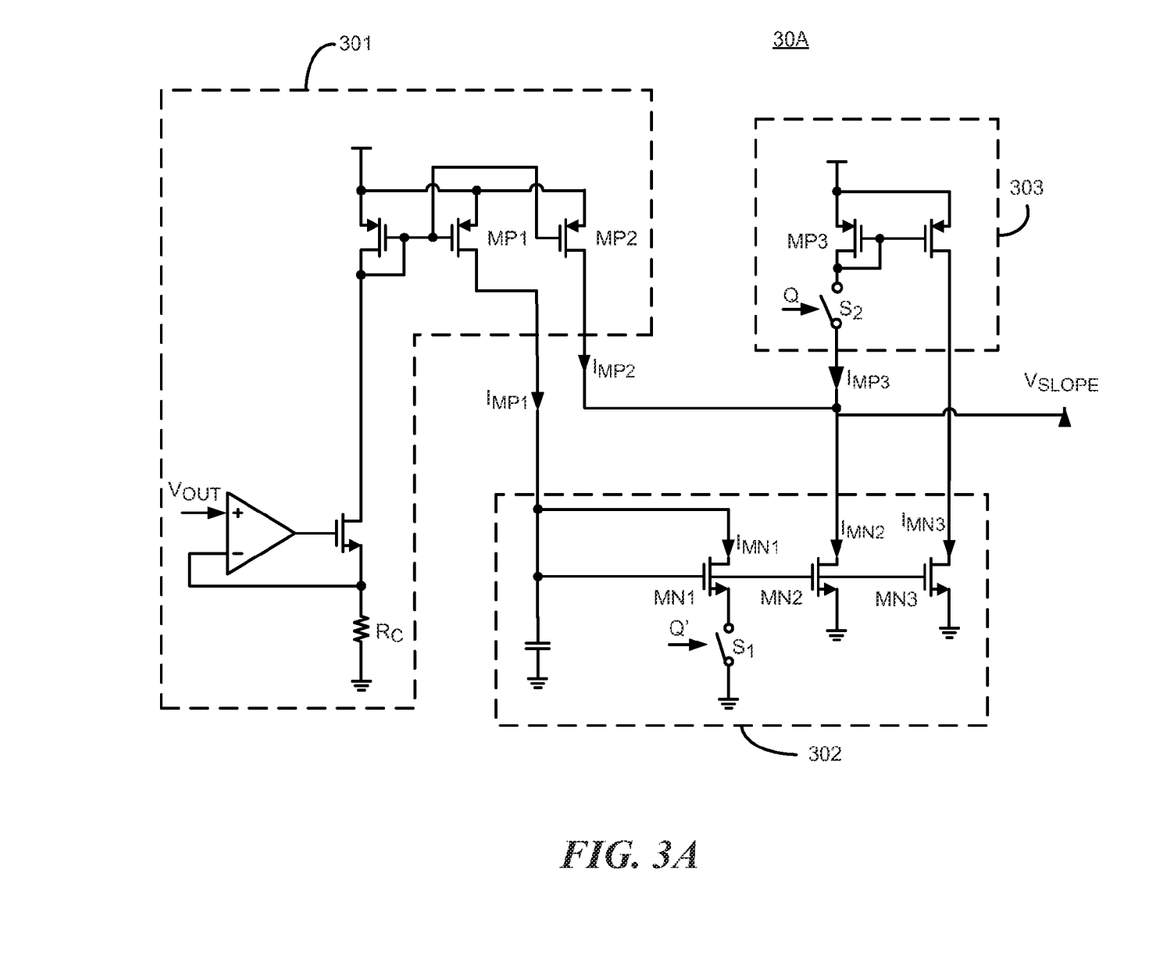
FIG. 3A~FIG. 3C illustrate an optional current circuit 30A for implementation of the current circuit of FIG. 2 in accordance with an embodiment of the present invention.

FIG. 3A illustrates an optional current circuit 30A for implementation of the current circuit of FIG. 2 in accordance with an embodiment of the present invention. As illustrated in FIG. 3A, the current circuit 30A comprises current mirrors 301, 302 and 303, wherein each pair of matched transistors of the current mirrors 301, 302 and 303 have substantially identical parameters. The current mirror 301 is configured to receive the output voltage $V_{OUT}$ and to further provide a reference current $$\frac{V_{OUT}}{R_C}$$

at an input terminal. Thus, the currents $I_{MP1}$ and $I_{MP2}$ respectively provided by transistors MP1 and MP2 at two output terminals of the current mirror 301 have the same value of $$\frac{V_{OUT}}{R_C},$$

in accordance with the well known operating principle of current mirrors. In current mirror 302, a switch S1 is serially coupled with a transistor MN1 and is controlled by the control signal Q', thus making the on time of the switch S1 equal to (1−D)×T and the off time thereof equal to D×T. Thus, there is (1−D)×$I_{MN2}$=(1−D)×$I_{MN3}$=$I_{MP1}$. As a result, the currents $I_{MN2}$ and $I_{MN3}$ respectively provided by the transistors MN2 and MN3 at two output terminals of the current mirror 302 have the same value of $$\frac{V_{OUT}}{R_C} \times \frac{1}{1-D}.$$

In current mirror 303, a switch S2 is serially coupled with a transistor MP3 and is controlled by the control signal Q. The current mirror 303 is configured to receive the current $I_{MN3}$, thus, the current provided by the transistor MP3 is $$\frac{V_{OUT}}{R_C} \times \frac{1}{1-D}.$$

Figure 3B:
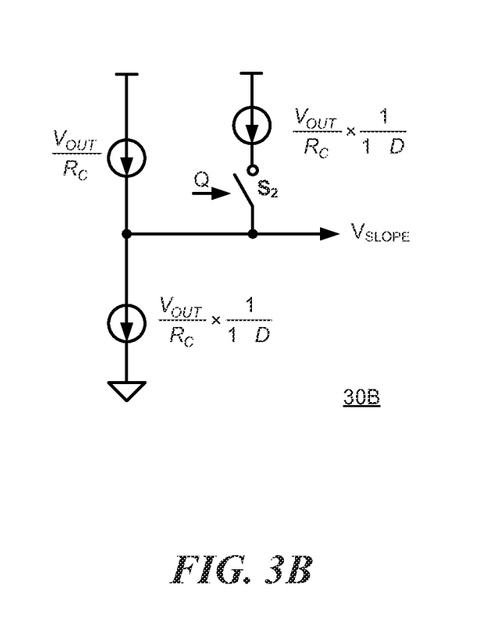
Figure 3C:
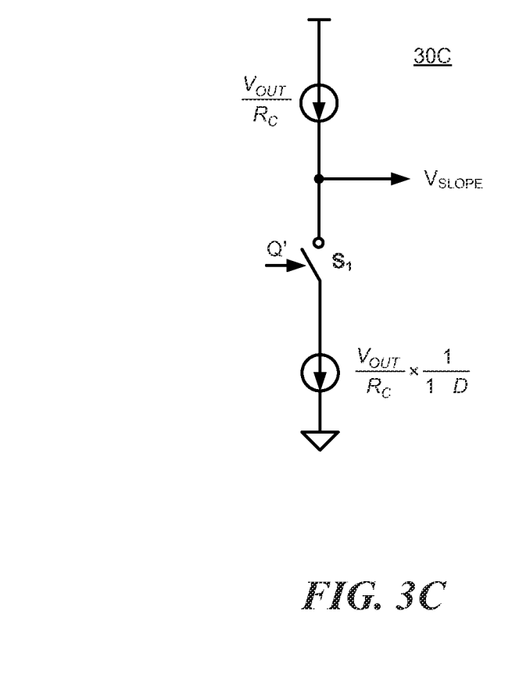

FIG. 3B illustrates an equivalent circuit 30B of the current circuit 30A of FIG. 3A. As the switch S2 is controlled by the control signal Q while the switch S1 is controlled by the complementary signal Q' of the control signal Q, the equivalent circuit 30B may be further equivalent to the circuit 30C as illustrated in FIG. 3C. As shown by the equivalent circuit 30C, the current circuit 30A of FIG. 3A is an exemplary circuit to implement the current circuit of FIG. 2.

Figure 4:
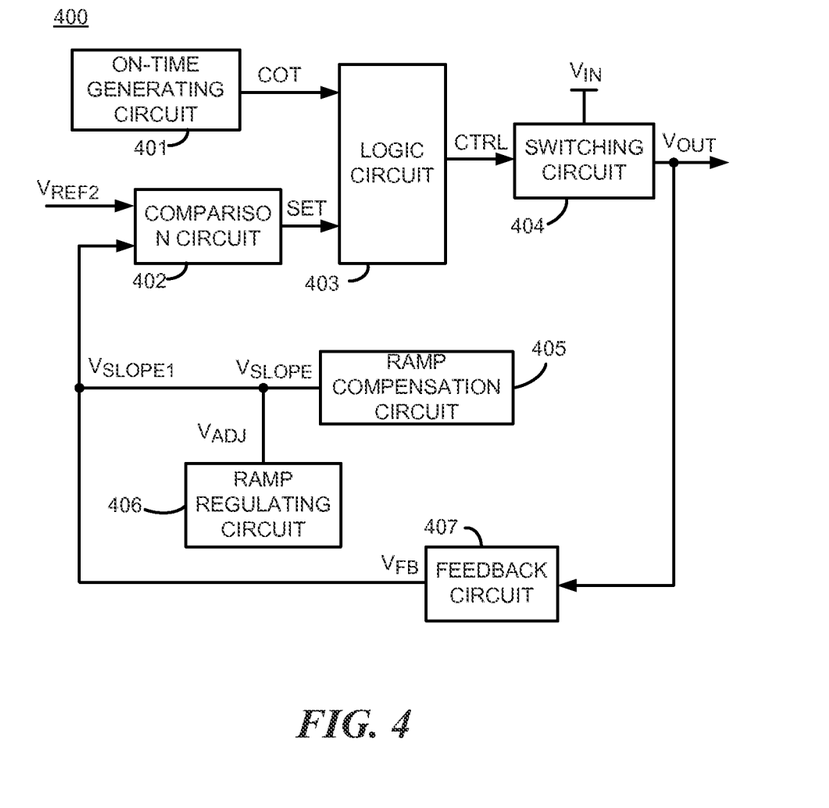
FIG. 4 illustrates a power converter 400 in accordance with an embodiment of the present invention.

FIG. 4 illustrates a power converter 400 in accordance with an embodiment of the present invention. The power converter 400 comprises a switching circuit 404, a feedback circuit 407 and a control circuit which comprises an on-time generating circuit 401, a comparison circuit 402, a logic circuit 403, a ramp compensation circuit 405 and a ramp regulating circuit 406.

The on-time generating circuit 401 is configured to generate an on-time control signal COT to control the on time of the switch/switches of the switching circuit 404. The feedback circuit 407 is configured to receive an output voltage $V_{OUT}$ provided by the switching circuit 404 and to generate a feedback voltage $V_{FB}$ based on the output voltage $V_{OUT}$.

The ramp compensation circuit 405 is configured to generate a ramp compensation signal $V_{SLOPE}$ having an amplitude $V_{SLOPE(PP)}$. The amplitude $V_{SLOPE(PP)}$ of the ramp compensation signal $V_{SLOPE}$ is proportional to 1−D with a scaling factor K, that is:

$$V_{SLOPE(PP)} = K \times (1-D) \quad (6)$$

wherein D represents the duty cycle of the main switch of the switching circuit 404.

The ramp regulating circuit 406 is configured to generate a ramp regulating signal $V_{ADJ}$ having an amplitude $V_{ADJ(PP)}$. The amplitude $V_{ADJ(PP)}$ of the ramp regulating signal $V_{ADJ}$ is proportional to the duty cycle D with the same scaling factor K, that is:

$$V_{ADJ(PP)} = K \times D \quad (7)$$

$V_{SLOPE1}$ represents the sum of the ramp compensation signal $V_{SLOPE}$ and the ramp regulating signal $V_{ADJ}$, wherein the amplitude $V_{SLOPE1(PP)}$ of the sum signal $V_{SLOPE1}$ may be expressed as:

$$V_{SLOPE1(PP)} = K \times (1-D) + K \times D = K \quad (8)$$

As can be observed from equation (8), the amplitude $V_{SLOPE1(PP)}$ of the sum signal $V_{SLOPE1}$ is irrelevant to the duty cycle D as the scaling factor K is constant, thus making a more stable system.

The comparison circuit 402 is configured to compare the sum of the feedback signal $V_{FB}$ and the sum signal $V_{SLOPE1}$ with a reference signal $V_{REF2}$ to generate a comparison signal SET.

The logic circuit 403 is configured to receive the on-time control signal COT and the comparison signal SET and to generate a control signal CTRL based on the on-time control signal COT and the comparison signal SET. The switching circuit 404 is configured to receive an input voltage $V_{IN}$ and to convert the input voltage $V_{IN}$ into the output voltage $V_{OUT}$ based on the control signal CTRL.

Figure 5:
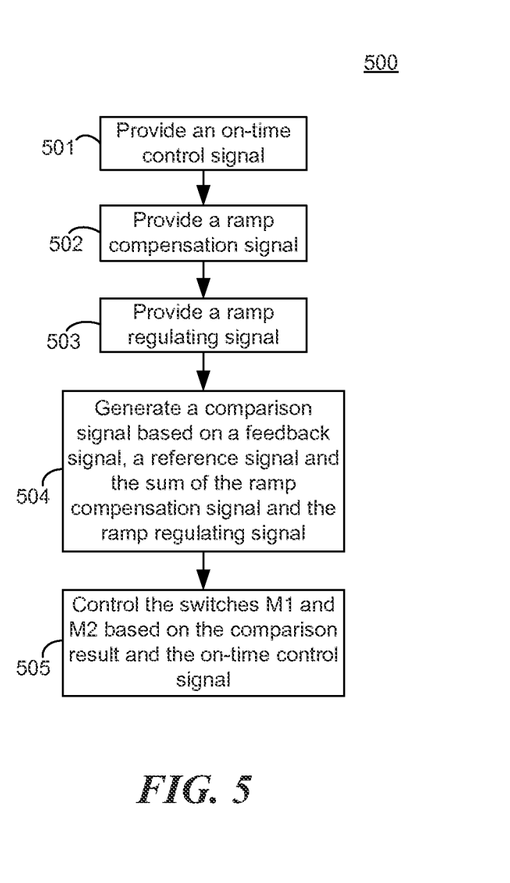
FIG. 5 illustrates a ramp compensation method 500 for a power converter in accordance with an embodiment of the present invention.

FIG. 5 illustrates a ramp compensation method 500 for a power converter in accordance with an embodiment of the present invention. The power converter comprises a switching circuit which comprises an inductor, a main switch M1 and a freewheeling element M2. The switching circuit is configured to generate an output voltage $V_{OUT}$. As shown in FIG. 5, the ramp compensation method 500 comprises steps 501-505. When the compensation method 500 gets started, step 501 is performed to generate an on-time control signal. A ramp compensation signal is provided in step 502, wherein the amplitude of the ramp compensation signal is directly proportional to 1−D, and wherein D represents the duty cycle of the main switch M1. And a ramp regulating signal is provided in step 503, wherein the amplitude of the ramp regulating signal is directly proportional to the duty cycle D. In the following step 504, it is performed to compare a reference signal with the sum of the ramp compensation signal, the ramp regulating signal and a feedback signal representative of the output voltage $V_{OUT}$ and to thereby generate a comparison result. Then in the next step 505, the main switch M1 and the freewheeling element M2 are turned on and off according to the on-time control signal and the comparison result.

In one embodiment, the ramp compensation signal is provided by a ramp compensation circuit comprising a compensation resistor $R_C$ electrically coupled to the inductor and a compensation capacitor $C_C$. In another embodiment, the step 503 of providing the ramp regulating signal comprises: delivering a current with an amplitude of $$\frac{V_{OUT}}{R_C}$$

to the compensation capacitor $C_C$ when the main switch M1 is turned on; absorbing a current with an amplitude of $$\frac{V_{OUT}}{R_C} \times \frac{D}{1-D}$$

from the compensation capacitor $C_C$ when the freewheeling element M2 is turned on; providing the voltage across the compensation capacitor $C_C$ as the ramp compensation signal.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A control circuit for a power converter, wherein the power converter comprises a switching circuit comprising a main switch, a freewheeling element and an inductor having a first terminal and a second terminal, and wherein the power converter is configured to convert an input voltage into an output voltage, the control circuit comprises:
   an on-time generating circuit configured to generate an on-time control signal;
   a ramp compensation circuit configured to generate a ramp compensation signal, wherein the amplitude of the ramp compensation signal is proportional to 1−D with a scaling factor, and wherein D represents the duty cycle of the main switch;
   a ramp regulating circuit configured to generate a ramp regulating signal, wherein the amplitude of the ramp regulating signal is proportional to D with the scaling factor;
   a comparison circuit electrically coupled to the ramp compensation circuit and the ramp regulating circuit, wherein the comparison circuit is configured to generate a comparison signal based on a feedback signal representative of the output voltage, a reference signal and the sum of the ramp compensation signal and the ramp regulating signal; and
   a logic circuit configured to generate a control signal based on the on-time control signal and the comparison signal to control the main switch and the freewheeling element.

2. The control circuit of claim 1, wherein the ramp regulating circuit comprises:
   a compensation capacitor; and
   a current circuit electrically coupled to the compensation capacitor, wherein the current circuit is configured to deliver a current $K \times V_{OUT}$ to the compensation capacitor when the main switch is turned on and to absorb a current $K \times V_{OUT} \times D/(1-D)$ from the compensation capacitor when the freewheeling element is turned on, and wherein $V_{OUT}$ represents the output voltage and K represents a scaling factor;
   wherein the voltage across the compensation capacitor when the current of the current circuit flows therethrough serves as the ramp regulating signal.

3. The control circuit of claim 2, wherein the current circuit comprises:
   a current source electrically coupled to the compensation capacitor to deliver a current $K \times V_{OUT}$ thereto;
   a current sink electrically coupled to the compensation capacitor to absorb a current $K \times V_{OUT}/(1-D)$ therefrom; and
   a switch electrically coupled to the current sink in series, wherein the switch is turned on and off synchronously with the freewheeling element so as to enable the current sink when the freewheeling element is on and to disable the current sink when the freewheeling element is off.

4. The control circuit of claim 3, wherein the ramp regulating circuit comprises:
   a first current mirror having an input terminal and an output terminal, wherein the input terminal is configured to receive a reference current proportional to the output voltage, and the output terminal is configured to provide a first current flowing into the ramp compensation capacitor;
   a second current mirror having an input terminal and an output terminal, wherein the input terminal is configured to receive the first current when the freewheeling element is on and the output terminal is configured to provide a second current flowing out of the compensation capacitor; and
   a third current mirror having an input terminal and an output terminal, wherein the input terminal is configured to receive the second current and the output terminal is configured to provide a third current flowing into the ramp compensation capacitor when the main switch is on;
   wherein the voltage across the compensation capacitor when the first current, the second current and the third current flow therethrough serves as the ramp regulating signal.

5. The control circuit of claim 1, wherein the ramp compensation circuit comprises:
   a compensation resistor having a first terminal and a second terminal, wherein the first terminal is electrically coupled to the first terminal of the inductor; and
   a compensation capacitor having a first terminal and a second terminal, wherein the first terminal is electrically coupled to the second terminal of the compensation resistor and is configured to provide the ramp compensation signal, and the second terminal is electrically coupled to the second terminal of the inductor.

6. The control circuit of claim 5, wherein the ramp regulating circuit comprises:
   the compensation capacitor of the ramp compensation circuit; and
   a current circuit electrically coupled to the compensation capacitor, wherein the current circuit is configured to deliver a current $K \times V_{OUT}$ to the compensation capacitor when the main switch is turned on and to absorb a current $K \times V_{OUT} \times D/(1-D)$ from the compensation capacitor when the freewheeling element is turned on, and wherein $V_{OUT}$ represents the output voltage and K represents a scaling factor;
   wherein the voltage across the compensation capacitor when the current of the current circuit flows therethrough serves as the ramp regulating signal.

7. The control circuit of claim 1, wherein the on-time generating circuit comprises:
   a resistor having a first terminal and a second terminal, wherein the first terminal is configured to receive the input voltage;
   a capacitor having a first terminal and a second terminal, wherein the first terminal is electrically coupled to the second terminal of the resistor and the second terminal is electrically coupled to a reference ground;
   a switch having a first terminal, a second terminal and a control terminal, wherein the first terminal is electrically coupled to the second terminal of the resistor, the second terminal is electrically coupled to the reference ground, and the control terminal is electrically coupled to the logic circuit to receive the control signal; and
   a comparator having a first input terminal, a second input terminal and an output terminal, wherein the first input terminal is electrically coupled to the first terminal of the capacitor to receive the voltage thereacross, the second input terminal is configured to receive a reference signal, and wherein the comparator compares the voltage across the capacitor with the reference signal and generates the on-time control signal at the output terminal.

8. The control circuit of claim 1, wherein the comparison circuit is configured to compare the reference signal with the sum of the ramp compensation signal, the ramp regulating signal and the feedback signal and to generate the comparison signal.

9. The control circuit of claim 1, wherein the switching circuit further comprises a capacitor, and wherein
the main switch has a first terminal, a second terminal and a control terminal, wherein the first terminal is configured to receive the input voltage, and the control terminal is electrically coupled to the logic circuit to receive the control signal;
the freewheeling element has a first terminal, a second terminal and a control terminal, wherein the first terminal is electrically coupled to the second terminal of the main switch, the second terminal is electrically coupled to a reference ground, and the control terminal is electrically coupled to the logic circuit to receive a control signal complementary to the control signal provided to the control terminal of the main switch;
the inductor has a first terminal and a second terminal, wherein the first terminal is electrically coupled to the second terminal of the main switch; and
the capacitor has a first terminal and a second terminal, wherein the first terminal is electrically coupled to the second terminal of the inductor, and the second terminal is electrically coupled to the reference ground, and wherein the voltage across the capacitor serves as the output voltage.

10. A power converter for converting an input voltage into an output voltage, comprising:
a switching circuit comprising a main switch, a freewheeling element and an inductor having a first terminal and a second terminal; and
a control circuit comprising:
an on-time generating circuit configured to generate an on-time control signal;
a ramp compensation circuit configured to generate a ramp compensation signal, wherein the amplitude of the ramp compensation signal is proportional to 1−D with a scaling factor, and wherein D represents the duty cycle of the main switch;
a ramp regulating circuit configured to generate a ramp regulating signal, wherein the amplitude of the ramp regulating signal is proportional to D with the scaling factor;
a comparison circuit electrically coupled to the ramp compensation circuit and the ramp regulating circuit, wherein the comparison circuit is configured to generate a comparison signal based on a feedback signal representative of the output voltage, a reference signal and the sum of the ramp compensation signal and the ramp regulating signal; and
a logic circuit configured to generate a control signal based on the on-time control signal and the comparison signal to control the main switch and the freewheeling element.

11. The power converter of claim 10, wherein the ramp regulating circuit comprises:
a compensation capacitor; and
a current circuit electrically coupled to the compensation capacitor, wherein the current circuit is configured to deliver a current $K \times V_{OUT}$ to the compensation capacitor when the main switch is turned on and to absorb a current $K \times V_{OUT} \times D/(1-D)$ from the compensation capacitor when the freewheeling element is turned on, and wherein $V_{OUT}$ represents the output voltage and K represents a scaling factor;
wherein the voltage across the compensation capacitor when the current of the current circuit flows therethrough serves as the ramp regulating signal.

12. The power converter of claim 11, wherein the current circuit comprises:
a current source electrically coupled to the compensation capacitor to deliver a current $K \times V_{OUT}$ thereto;
a current sink electrically coupled to the compensation capacitor to absorb a current $K \times V_{OUT}/(1-D)$ therefrom; and
a switch electrically coupled to the current sink in series, wherein the switch is turned on and off synchronously with the freewheeling element so as to enable the current sink when the freewheeling element is on and to disable the current sink when the freewheeling element is off.

13. The power converter of claim 12, wherein the ramp regulating circuit comprises:
a first current mirror having an input terminal and an output terminal, wherein the input terminal is configured to receive a reference current proportional to the output voltage, and the output terminal is configured to provide a first current flowing into the ramp compensation capacitor;
a second current mirror having an input terminal and an output terminal, wherein the input terminal is configured to receive the first current when the freewheeling element is on and the output terminal is configured to provide a second current flowing out of the compensation capacitor; and
a third current mirror having an input terminal and an output terminal, wherein the input terminal is configured to receive the second current and the output terminal is configured to provide a third current flowing into the ramp compensation capacitor when the main switch is on;
wherein the voltage across the compensation capacitor when the first current, the second current and the third current flow therethrough serves as the ramp regulating signal.

14. The power converter of claim 10, wherein the ramp compensation circuit comprises:
a compensation resistor having a first terminal and a second terminal, wherein the first terminal is electrically coupled to the first terminal of the inductor; and
a compensation capacitor having a first terminal and a second terminal, wherein the first terminal is electrically coupled to the second terminal of the compensation resistor and is configured to provide the ramp compensation signal, and the second terminal is electrically coupled to the second terminal of the inductor.

15. The power converter of claim 14, wherein the ramp regulating circuit comprises:
the compensation capacitor of the ramp compensation circuit; and
a current circuit electrically coupled to the compensation capacitor, wherein the current circuit is configured to deliver a current $K \times V_{OUT}$ to the compensation capacitor when the main switch is turned on and to absorb a current $K \times V_{OUT} \times D/(1-D)$ from the compensation capacitor when the freewheeling element is turned on, and wherein $V_{OUT}$ represents the output voltage and K represents a scaling factor;

wherein the voltage across the compensation capacitor when the current of the current circuit flows therethrough serves as the ramp regulating signal.

16. The power converter of claim 10, wherein the on-time generating circuit comprises:
   a resistor having a first terminal and a second terminal, wherein the first terminal is configured to receive the input voltage;
   a capacitor having a first terminal and a second terminal, wherein the first terminal is electrically coupled to the second terminal of the resistor and the second terminal is electrically coupled to a reference ground;
   a switch having a first terminal, a second terminal and a control terminal, wherein the first terminal is electrically coupled to the second terminal of the resistor, the second terminal is electrically coupled to the reference ground, and the control terminal is electrically coupled to the logic circuit to receive the control signal; and
   a comparator having a first input terminal, a second input terminal and an output terminal, wherein the first input terminal is electrically coupled to the first terminal of the capacitor to receive the voltage thereacross, the second input terminal is configured to receive a reference signal, and wherein the comparator compares the voltage across the capacitor with the reference signal and generates the on-time control signal at the output terminal.

17. The power converter of claim 10, wherein the switching circuit further comprises a capacitor, and wherein
   the main switch has a first terminal, a second terminal and a control terminal, wherein the first terminal is configured to receive the input voltage, and the control terminal is electrically coupled to the logic circuit to receive the control signal;
   the freewheeling element has a first terminal, a second terminal and a control terminal, wherein the first terminal is electrically coupled to the second terminal of the main switch, the second terminal is electrically coupled to a reference ground, and the control terminal is electrically coupled to the logic circuit to receive a control signal complementary to the control signal provided to the control terminal of the main switch;
   the inductor has a first terminal and a second terminal, wherein the first terminal is electrically coupled to the second terminal of the main switch; and
   the capacitor has a first terminal and a second terminal, wherein the first terminal is electrically coupled to the second terminal of the inductor, and the second terminal is electrically coupled to the reference ground, and wherein the voltage across the capacitor serves as the output voltage.

18. A control method for controlling a switching circuit, wherein the switching circuit comprises a main switch and a freewheeling element, and wherein the switching circuit is configured to provide an output voltage, the control method comprises:
   generating an on-time control signal;
   generating a ramp compensation signal, wherein the amplitude of the ramp compensation signal is proportional to 1−D with a scaling factor, and wherein D represents the duty cycle of the main switch;
   generating a ramp regulating signal, wherein the amplitude of the ramp regulating signal is proportional to D with the scaling factor;
   generating a comparison signal based on a feedback signal representative of the output voltage, a reference signal and the sum of the ramp compensation signal and the ramp regulating signal; and
   controlling the main switch and the freewheeling element on and off according to the on-time control signal and the comparison signal.

19. The control method of claim 18, wherein the step of generating the ramp regulating signal comprises:
   delivering a current $K \times V_{OUT}$ to a compensation capacitor when the main switch is turned on, wherein $V_{OUT}$ represents the output voltage and K represents a scaling factor;
   absorbing a current $K \times V_{OUT} \times D/(1-D)$ from the compensation capacitor when the freewheeling element is turned on; and
   providing the voltage across the compensation capacitor created by the delivered and absorbed currents flowing therethrough as the ramp regulating signal.

20. The control method of claim 19, wherein the step of generating the ramp regulating signal comprises:
   delivering a current $K \times V_{OUT}$ to the compensation capacitor during the entire switching period of the main switch; and
   absorbing a current $K \times V_{OUT}/(1-D)$ from the compensation capacitor when the freewheeling element is on.

* * * * *